Patented Dec. 27, 1927.

1,654,240

UNITED STATES PATENT OFFICE.

FRANK JAMES DAVIS, OF CLAPHAM PARK, LONDON, ENGLAND.

METHOD OF SECURING LAYERS OF RUBBER TO LAYERS OF OTHER MATERIAL OR TO RUBBER, PARTICULARLY WITH REFERENCE TO FOOTWEAR.

No Drawing. Application filed December 29, 1926, Serial No. 157,862, and in Great Britain December 15, 1925.

This invention relates to a method of applying layers of rubber or rubber composition or rubber soles and heels and is of special utility in the application of soles and heels of vulcanized rubber or of crepe rubber to soles of leather or similar or other material such as usually employed in the manufacture of boots and shoes and to which it is generally difficult securely to apply soles or heels of rubber.

The invention has among its objects very securely to apply the indiarubber sole in position so that it may not become detached in use.

According to the invention the layer of indiarubber or indiarubber composition has applied to its rear face a solution of indiarubber, and upon this layer of rubber solution rubber latex is sprayed, whereby on evaporation of the moisture, a thin film of rubber remains over the rubber solution. On the drying of the layer of latex, a sole or heel thus prepared may be applied to the leather or other sole or heel of the boot or shoe. Two coats of solution are advantageously applied upon the leather or other sole or heel and one coating of solution is advantageously applied upon the latex face of the sole or heel thus prepared.

It will be understood that in the application of the latex by spraying, it is necessary that the moisture should be evaporated and this can conveniently be done by exposing the rubber layers or soles or heels on which the latex has been applied, to the atmosphere, or by causing heated air to be passed over the treated soles or heels by such means as a fan. After drying, a further quantity of latex may be sprayed if a thicker film of rubber is desired, and after drying, the spraying may be repeated until a film of the desired thickness has been built up. It will however be understood that useful results may be secured in the production of a film by only one application of the latex by spraying.

The spraying may be effected in the use of compressed air passed through an injector nozzle in known manner. The layer of latex may advantageously be sprayed after the solvent in the layer of rubber solution has partially or almost completely evaporated.

It will be understood that when the layer of latex is adequately dried, it is not tacky as is the surface of the layer of rubber solution to which it is applied, but may become tacky as for example from the heat of the hand.

The invention comprises the product, namely, the layer or sheet of rubber or rubber composition or the sole or heel or a combined sole and heel or sections of soles or heels having latex applied over a layer of rubber solution in the manner described. Pairs of indiarubber soles or heels thus prepared may be put up one upon the other for sale by applying two prepared heels or soles together, with their latex faces oppositely disposed and separated by a layer of linen cloth or other material such as glazed paper or other material having a polished, smooth and non-adherent surface.

The invention is applicable generally in securing indiarubber layers to surfaces or layers of other material or to indiarubber, or in securing together layers of composition in which rubber is incorporated, to layers of other or the same or similar material.

I claim:

A method of preparing layers of indiarubber for application to surfaces of other material or of indiarubber, consisting in the following steps, viz, (a) applying upon the contact face of the layer of indiarubber a solution of indiarubber, (b) spraying rubber latex upon the layer of indiarubber in solution, and (c) evaporating the moisture from the rubber latex applied, to yield a thin film of indiarubber over the layer of indiarubber in solution, substantially as described.

FRANK JAMES DAVIS.